Patented Dec. 8, 1953

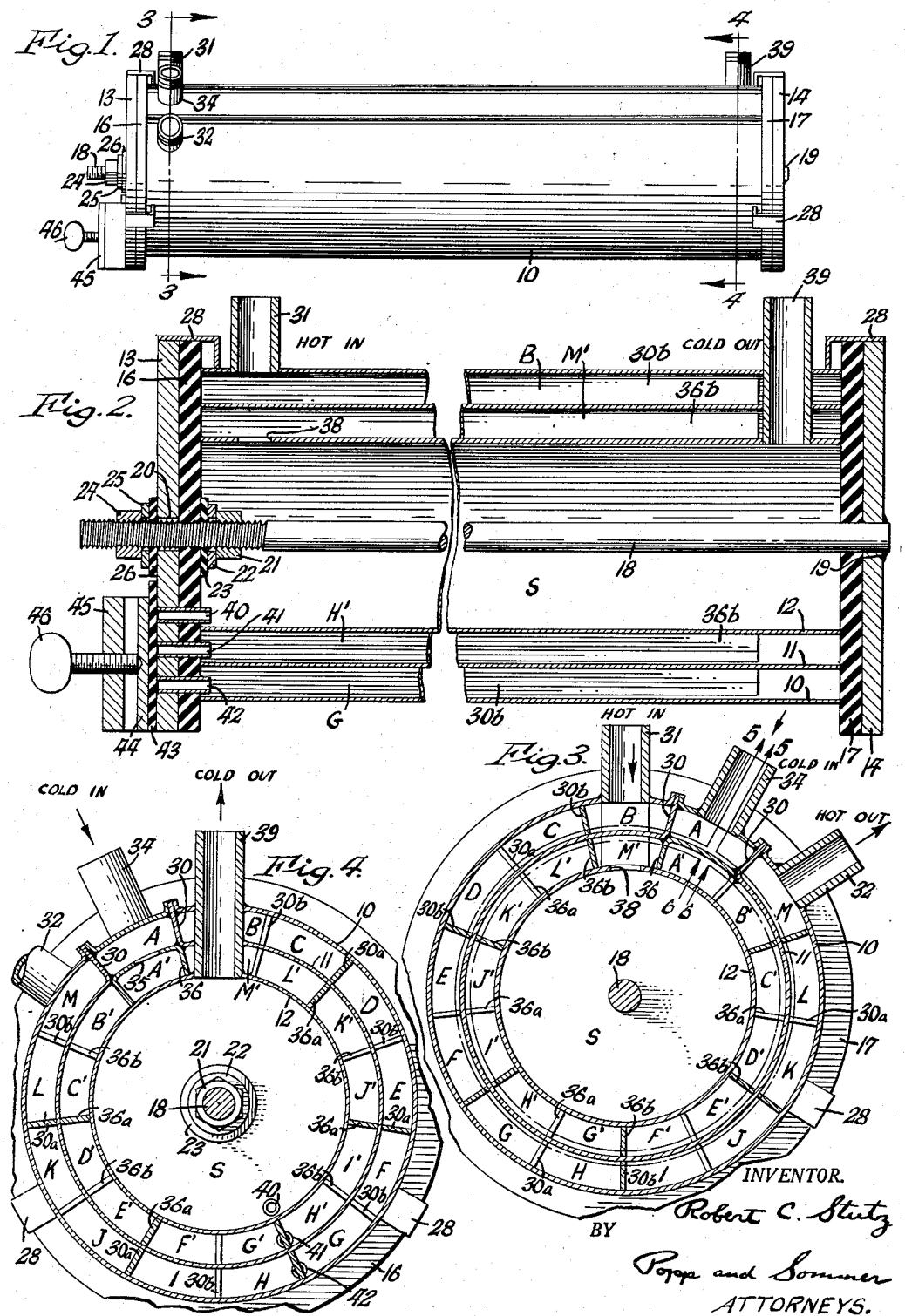

2,661,934

UNITED STATES PATENT OFFICE 2,661,934

LIQUID-TO-LIQUID HEAT EXCHANGER

Robert C. Stutz, Buffalo, N. Y., assignor to Niagara Blower Company, New York, N. Y., a corporation of New York Application November 8, 1950, Serial No. 194,606

4 Claims. (Cl. 257—246)

1

This invention relates to a heat exchanger and more particularly to a liquid-to-liquid heat exchanger for use with a liquid which tends to develop fine solids on being heated, the heat exchanger being provided with a settling chamber of adequate cross section to permit these fine solids to settle out instead of being conveyed to other apparatus. However, features of the invention can be employed in heat exchangers which do not have such a settling chamber.

Where certain anti-freeze media have been employed in the apparatus shown, for example, in the Olstad Patent No. 2,352,655 issued July 4, 1944, for Bubble Tower, it was found that fine solids developed on heating the liquid containing the anti-freeze medium in passing from the low temperature spray cooler to the concentrator where the dilute spray liquid is heated to drive off the water and restore the desired concentration of the anti-freeze medium in the spray liquid. These solids settled on the heating surface of the concentrator so as to impair the heat transfer efficiency thereof. The present heat exchanger is particularly designed to be placed in the feed and return lines for such a concentrator and includes a settling chamber in which the solids formed on being heated by passage through the heat exchanger settle out and hence do not reach the concentrator.

It is accordingly one of the principal objects of the present invention to provide a simple form of liquid-to-liquid heat exchanger which includes a settling chamber through which one of the streams of liquid leaves the exchanger thereby to permit of settling out of any solids formed as a result of the heat exchange.

A further object of the invention is to provide such a heat exchanger in which all heat transfer surfaces can be very easily cleaned.

A further object is to provide a heat exchanger which has a large area of heat transfer surface contained within a compact structure and in which a high rate of heat transfer is obtained by continuous reversal of direction of the flow of each stream of liquid passing through the heat exchanger.

Another object is to provide such a heat exchanger which is extremely simple in construction so that it can be fabricated at low cost.

Other objects and advantages of the invention will appear from the following description and drawings in which:

Fig. 1 is a side elevational view of the heat exchanger embodying the present invention.

Fig. 2 is an enlarged fragmentary vertical longitudinal central section therethrough.

2

Figs. 3 and 4 are sections taken on correspondingly numbered lines on Fig. 1 and viewed from the directions indicated by the arrows associated with these lines.

Figure 5:
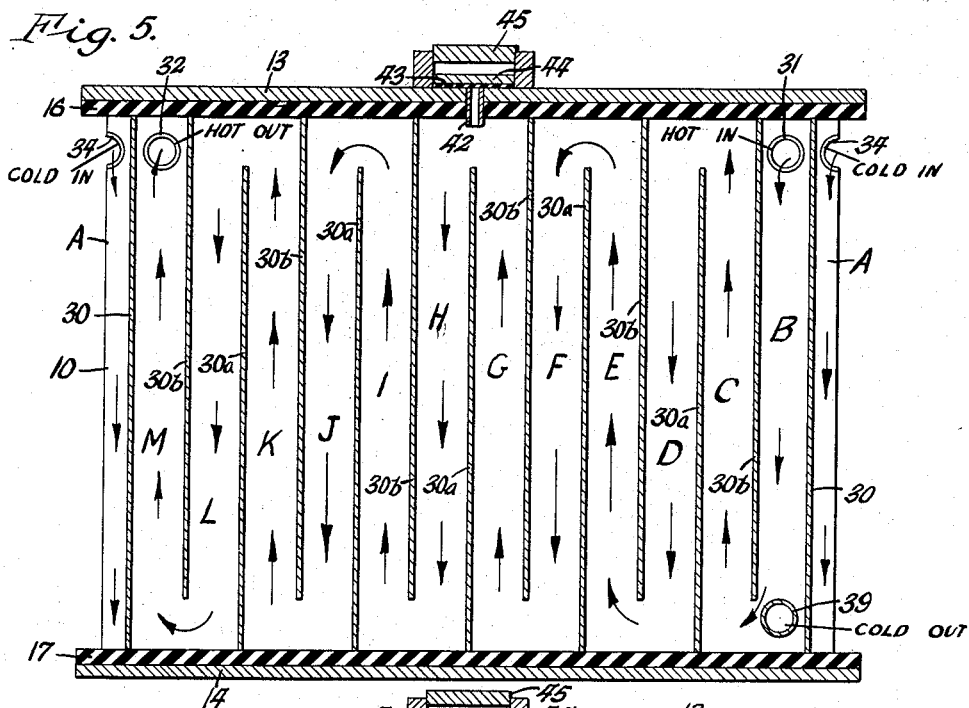

Fig. 5 is a developed or laid-out cylindrical section, this section being taken along the line 5—5 in Fig. 3, looking radially outwardly.

Figure 6:
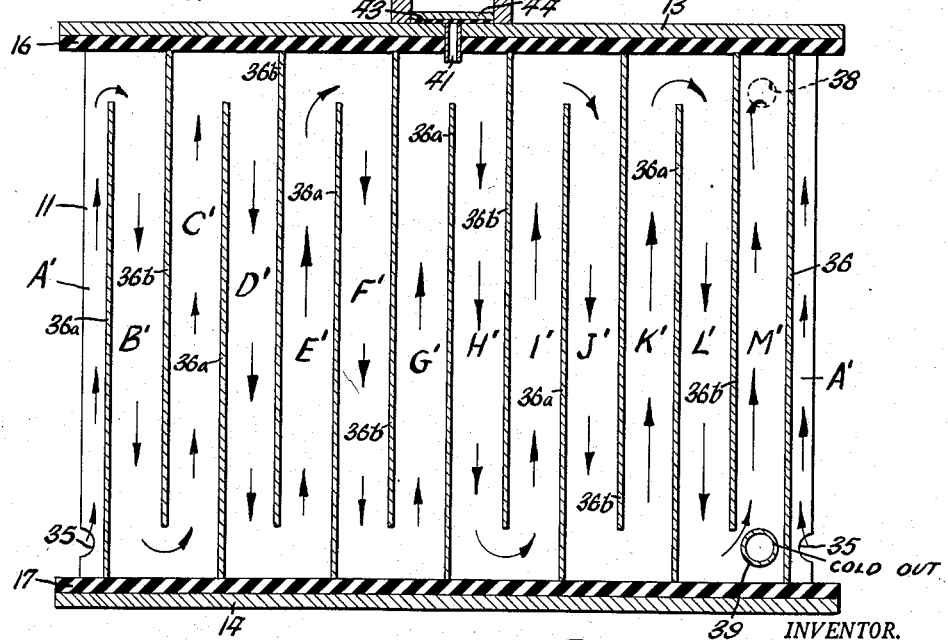

Fig. 6 is also a developed or laid-out cylindrical section, this section being taken along the line 6—6 in Fig. 3 and also looking outwardly.

The heat exchanger comprises three elongated cylindrical sheet metal shells of the same length, the outer shell being designated at 10, the intermediate shell being designated at 11 and the inner shell being designated at 12. The ends of these shells are closed by front and rear end heads 13 and 14, respectively, circular disk-like gaskets 16 and 17 being interposed between these shells and end heads. These end heads are drawn together by a central or coaxial tie bolt 18 which can extend through and be welded to the end head 14, as indicated at 19 and can have its opposite end threaded and extend through an unthreaded opening 20 in the end head 13. Within the heat exchanger a backing nut 21 is screwed on the threaded end of the tie bolt 18 and a metal washer 22 and resilient sealing washer 23 are shown as interposed between this backing nut 21 and the gasket 16 so as to insure against leakage through the central opening 20 of the end head 13. The end heads 13 and 14 are drawn into sealed engagement with the opposite ends of the shells 10, 11 and 12 by a nut 24 on the outer threaded end of the tie bolt 18. To further insure against leakage through the opening 20 in the end head 13 a metal washer 25 and resilient sealing washer 26 are shown as interposed between this tightening nut 24 and the end head 13 around its opening 20.

In order to insure proper coaxial alinement of the end heads 13 and 14 with the cylindrical shells 10, 11 and 12, alinement fingers 28 are provided, each of these alinement fingers being shown as made of an L-shaped strip of metal having one leg secured to the periphery of the corresponding end head 13 or 14 to extend over the corresponding gasket 16 or 17 and having its other leg projecting radially inwardly a sufficient distance to engage the periphery of the outer shell 10 when the end heads are in coaxial relation with the outer shell. These alining fingers can be provided in a suitable number, three being shown, around the periphery of the end heads to insure exact coaxial alinement of each end head with the outer shell 10 when the heat exchanger is being assembled.

The space between the outer and intermediate shells 10 and 11 is divided into a plurality of chambers, passages or passes which are of segmental form in cross section by a plurality of radial partitions 30, 30a and 30b. The partitions 30 are two in number, arranged in spaced relation adjacent to each other, and extend the full length of the cylindrical shells 10 and 11 so as to engage the gaskets 16 and 17 and provide a chamber A therebetween which is closed at its ends. The partitions 30a and 30b are identical in size, each being shorter than the cylindrical shells 10 and 11 with the ends of partitions 30a engaging the gasket 17 and hence being spaced from the gasket 16 and the partitions 30b being arranged in alternation with the partitions 30a and in engagement with the gasket 16 and hence being spaced from the gasket 17. It will be therefore seen that the alternate partitions 30a and 30b provide a series of passages or passes B, C, D, E, etc., extending counterclockwise, as viewed in Fig. 3, from the partition 30 forming the left hand side of the chamber A to the partition 30 forming the right hand side of this chamber. It will also be seen that these partitions 30a and 30b cause the liquid to flow in alternately opposite directions the full length of the shells 10 and 11 in passing through the successive passages or passes B, C, etc. thereby to bring the stream of liquid into contact with all parts of the intermediate shell 11 and the partitions 30a and 30b as well as to cause a reversal of liquid flow at the end of each of these passes so as to provide turbulence and high heat transfer efficiency. The stream of liquid passing through these passes B, C, etc., and which will hereinafter be designated as the hot liquid, is introduced into the chamber B through an inlet pipe 31 welded in and projecting radially from the outer shell 10, and this stream of hot liquid is discharged from the final pass M through an outlet tube 32 which is also welded in and projects radially from the outer shell 10.

The stream of cold liquid to be heated is introduced into the chamber A through an inlet tube 34 which is welded in and projects radially from the outer shell 10. Since this chamber A is closed at its ends by the partitions 30, 30 engaging the gaskets 16 and 17, this incoming cold liquid is constrained to pass through a circular opening 35 provided in the intermediate shell 11 at the end of the chamber A opposite from the inlet tube 34 as best shown in Figs. 4–6 and into the space between the intermediate shell 11 and the inner shell 12.

As with the space between the outer shell 10 and the intermediate shell 11, this space between the intermediate shell 11 and inner shell 12 is divided into a plurality of passages or passes, which are segmental in cross section, by a plurality of radial partitions 36, 36a and 36b. The partition 36, of which only one is provided, extends the full length of the cylindrical shells 11 and 12 and engages the gaskets 16 and 17 so as to provide an axially extending barrier extending the full length of the space between these shells. This full length partition 36 is arranged radially inwardly from partition 30 which separates the chambers A and B and hence is arranged to the left of the opening 34 as viewed in Fig. 3.

The partitions 36a and 36b are identical in size, each being shorter than the cylindrical shells 11 and 12 and being arranged in alternation with each other, the partitions 36a being in sealing contact with the gasket 17 and hence spaced from the gasket 16 and the partitions 36b being arranged in sealing engagement with the gasket 16 and hence in spaced relation to the gasket 17. It will accordingly be seen that these partitions 30a and 30b provide a series of axially extending passages or passes through which the cold liquid is constrained to pass first in one direction and then in the opposite direction the full length of the cylindrical shells 11 and 12 a multiplicity of times. These passes are designated in succession as A', B', C', D', etc., starting from the pass A' which receives the cold liquid from the hole 35 and progressing clockwise, as viewed in Fig. 3, to the opposite side of the full length partition 36. The liquid from the final pass M' is relieved through a hole 38 in the inner cylindrical shell 12 and flows into a settling chamber S enclosed by this inner cylindrical shell.

In this large chamber the velocity of flow of the entering cold liquid is very materially reduced and any fine solids formed in this stream of entering cold liquid because of its having been heated by heat exchange with the entering hot liquid settle to the bottom of this chamber S instead of being carried away from the heat exchanger to be deposited on the surface of subsequent apparatus. The clarified liquid from the settling chambers S escapes through an outlet tube 39 which extends radially through each of the cylindrical shells 10, 11 and 12 and is suitably welded to each.

In order to permit of conveniently draining the heat exchanger before taking it apart for the purpose of cleaning or inspecting the same, the end head 13 is provided with three small drain tubes 40, 41 and 42, extending horizontally therethrough and into the lowermost portions of the settling chamber S, the space between the inner and intermediate cylindrical shells 11 and 12, and the space between the outer and intermediate cylindrical shells 10 and 11. When not used for draining, the outer ends of these tubes 40, 41 and 42 can be jointly sealed by a rectangular sheet 43 or rubber or other yielding sealing material and which can be compressed against the ends of these tubes by a clamping plate 44 contained within a U-shaped metal bracket 45, the legs of which can be welded to the end head 13. A thumb screw 46 working in the bracket 45 can be used to exert pressure against the clamping plate 44 so as to in turn exert sealing pressure against the sheet 43 of resilient sealing material.

In operation, the stream of cold liquid to be warmed enters through the inlet tube 34 into one end of the chamber A and travels the full length of this chamber to the opening 35. This stream passes through this opening 35 into the passage or pass A' and thence passes the full length of the chamber A' and through the space between the adjacent partition 36a and the gasket 16 and into the passage or pass B'. The stream then passes the full length of this pass B' and through the space between the adjacent partition 36b and the gasket 17 into the pass C'. This movement of this stream of liquid is continued in the same manner through the several passes C', D', etc., until the stream reaches the final pass M'. It will be seen that the stream in each pass moves the full length of the cylindrical shells 11 and 12 and in heat exchange relation with the surface of the intermediate shell 11 and hence is progressively heated by the stream of hot liquid passing in counterflow relation on the other or outer side of this intermediate cylindrical shell 11 as hereinafter described.

From the final pass or compartment M' the heated stream of cold liquid passes through the opening 38 into the settling chamber S formed by the inner cylindrical shell 12. This settling chamber S is large in cross section and hence the velocity of the stream of liquid is very materially reduced in flowing through this settling chamber to the outlet tube 39 through which this stream leaves the heat exchanger. Accordingly any fine solids developing in this entering cold stream of liquid as a result of being heated in its passage along the several passes A', B', etc. settle out in the settling chamber S and a clear stream of liquid leaves through the outlet tube 39.

The hot stream of liquid enters through the inlet tube 31 into one end of the first pass or passage B and travels the full length of this pass or passage and through the space between the adjacent partition 30b and the gasket 17 into the pass or passages C. This stream then passes the full length of this pass and through the space between the end of the adjacent partition 30a and the gasket 16 into the pass D. Similarly this stream flows in succession through the several passes D, E, etc. until it reaches the final pass or passage M. In each pass B, C, etc. the stream passes the full length of the cylindrical shells 10 and 11 and in heat exchange relation with the intermediate shell 11 so that heat is absorbed by the cold liquid flowing in contact with the opposite side of this intermediate shell 11 as previously described. On reaching the final pass M, the stream of hot entering liquid passes the full length of this compartment and out through the outlet tube 32 and from the heat exchanger.

When it is desired to remove the sediment from the settling chamber S, or to clean the two series of passages or passes A, B, etc. and A', B', etc. the operator first loosens the thumb screw 46 so as to permit of removing the clamping plate 44 and sheet of resilient sealing material 43. This permits the liquid contained in the settling chamber to drain through a small drain tube 40. This also permits the liquid in all of the passes A', B', etc. to escape through the drain tube 41, the liquid flowing from pass to pass until it reaches the lowermost passes G' and H' which communicate with the drain tube 41. This also permits the liquid in all of the passes A, B, etc. to escape through the drain tube 42, the liquid flowing pass to pass until it reaches the lowermost passes G and H which communicate with the drain tube 42.

The operator then removes the nut 24 from the tie rod 18 so as to permit withdrawal of the end head 13 and gasket 16 as well as to permit removal of the opposite end head 14 and gasket 17 to which the opposite end of the tie rod is secured. In this condition it will be seen that each end of the settling chamber S is open and hence a brush can be passed through the settling chamber so as to completely clean the same. In this condition it will also be noted that the opposite ends of each pass A, B, etc. as well as the opposite ends of each pass A', B', etc. are open so that brushes can be passed through these passes, the only obstructed passes being the passes B and M' through which the outlet tube 39 from the settling chamber S extends and this tube being at one end of the heat exchanger so that cleaning of these particular passes presents no material difficulty.

After the heat exchanger has been cleaned, the heads are replaced, the guide fingers 28 insuring proper coaxial alinement thereof with the cylindrical shells 10, 11 and 12 and the nut 24 is replaced and tightened so as to prevent leakage between the gaskets 16 and 17 and the ends of these shells 10, 11 and 12 as well as with the contacting ends of the partitions 30, 30a and 30b and also the partitions 36, 36a and 36b. The operator then replaces the sheet 43 of sealing material and the clamping plate 44 and tightens the thumb screw 46 so as to seal the outlet ends of the three small drain tubes 40, 41 and 42.

From the foregoing it will be seen that the present invention provides an extremely simple and effective heat exchanger through which the hot and cold streams of liquid flow in counterflow relation and obtain a high rate of heat transfer therebetween. It will further be seen that the heat exchanger is particularly adapted for use with liquids which on being heated in passing through the heat exchanger develop fine solids capable of settling out in the settling chamber S. It will further be seen that the heat exchanger can readily be kept clean so as to operate at high efficiency.

I claim:

1. A heat exchanger, comprising spaced outer, intermediate and inner tubular open ended sheet metal shells of substantially the same length arranged in generally concentric, spaced relation to one another, a pair of end heads, gaskets arranged against the opposing faces of said end heads and each removably engaging and enclosing corresponding ends of all of said shells, means arranged to draw said end heads together to force said gaskets against said ends of all of said shells, a first series of radial partitions extending lengthwise of and connecting said outer and intermediate shells and forming a circumferential first series of axially extending passages enclosed at their ends by said end heads with alternate partitions engaging the same end head and spaced from the opposite end head to provide a first series of passes adapted to conduct a stream of fluid back and forth the full length of said shells, a radial partition extending the full length of and connecting said outer and intermediate shells and engaging both of said end heads to provide an entering and a leaving pass in said first series of passes, an inlet communicating with said entering pass, an outlet communicating with said leaving pass, a second series of radial partitions extending lengthwise of and connecting said intermediate and inner shells and forming a second circumferential series of axially extending passages enclosed at their ends by said end heads with alternate partitions of said second series engaging the same end head and spaced from the opposite end head to provide a second series of passes adapted to conduct a stream of a second fluid back and forth substantially the full length of said shells, another radial partition extending the full length of and connecting said intermediate and inner shells and engaging both of said end heads to provide an entering and a leaving pass in said second series of passes, another inlet communicating with said entering pass of said second series of passes, and another outlet communicating with said leaving pass of said second series of passes.

2. A heat exchanger, comprising spaced outer, intermediate and inner tubular open ended sheet metal shells of substantially the same length arranged in generally concentric, spaced relation to one another, a pair of end heads, gaskets arranged against the opposing faces of said end heads and each removably engaging and enclosing corresponding ends of all of said shells, a tie bolt connected at one end to a central part of one of said end heads and having a threaded end extending through an aperture in the other of said end heads, a nut on said threaded end and arranged to draw said end heads together to force said gaskets against said ends of all of said shells, a first series of radial partitions extending lengthwise of and connecting said outer and intermediate shells and forming a circumferential first series of axially extending passages enclosed at their ends by said end heads with alternate partitions engaging the same end head and spaced from the opposite end head to provide a first series of passes adapted to conduct a stream of fluid back and forth the full length of said shells, a radial partition extending the full length of and connecting said outer and intermediate shells and engaging both of said end heads to provide an entering and a leaving pass in said first series of passes, an inlet extending through said outer shell and communicating with said entering pass, an outlet extending through said outer shell and communicating with said leaving pass, a second series of radial partitions extending lengthwise of and connecting said intermediate and inner shells and forming a second circumferential series of axially extending passages enclosed at their ends by said end heads with alternate partitions of said second series engaging the same end head and spaced from the opposite end head to provide a second series of passes adapted to conduct a stream of a second fluid back and forth substantially the full length of said shells, another radial partition extending the full length of and connecting said intermediate and inner shells and engaging both of said end heads to provide an entering and a leaving pass in said second series of passes, another inlet extending through said outer shell and communicating with said entering pass of said second series of passes, and another outlet extending through said outer shell and communicating with said leaving pass of said second series of passes.

3. A heat exchanger, comprising spaced outer, intermediate and inner tubular open ended sheet metal horizontally disposed shells of substantially the same length arranged in generally concentric, spaced relation to one another, a pair of end heads, gaskets arranged against the opposing faces of said end heads and each removably engaging and enclosing corresponding ends of said shells, a tie bolt connected at one end to a central part of one of said end heads and having a threaded end extending through an aperture in the other of said end heads, a nut on said threaded end and arranged to draw said end heads together to force said gaskets against said ends of all of said shells, a first series of radial partitions extending lengthwise of and connecting said outer and intermediate shells and forming a circumferential first series of axially extending passages enclosed at their ends by said end heads with alternate partitions engaging the same end head and spaced from the opposite end head to provide a first series of passes adapted to conduct a stream of fluid back and forth the full length of said shells, a radial partition in the upper part of said heat exchanger and extending the full length of and connecting said outer and intermediate shells and engaging both of said end heads to provide in the upper part of said heat exchanger an entering and a leaving pass in said first series of passes, an inlet communicating with said entering pass, an outlet communicating with said leaving pass, a second series of radial partitions extending lengthwise of and connecting said intermediate and inner shells and forming a second circumferential series of axially extending passages enclosed at their ends by said end heads with alternate partitions of said second series engaging the same end head and spaced from the opposite end head to provide a second series of passes adapted to conduct a stream of a second fluid back and forth substantially the full length of said shells, another radial partition in the upper part of said heat exchanger and extending the full length of and connecting said intermediate and inner shells and engaging both of said end heads to provide in the upper part of said heat exchanger an entering and a leaving pass in said second series of passes, another inlet communicating with said entering pass of said second series of passes, another outlet communicating with said leaving pass of said second series of passes, said another outlet discharging into the upper part of the interior of said inner shell, and an outlet from the upper part of the interior of said inner shell whereby said interior of said inner shell forms a settling chamber.

4. A heat exchanger, comprising spaced outer, intermediate and inner tubular open ended sheet metal horizontally disposed shells arranged in generally concentric, spaced relation to one another, a pair of end heads each removably engaging and enclosing corresponding ends of all of said shells, means removably holding each of said end heads in engagement with the corresponding end of each of said shells, a first series of radial partitions extending lengthwise of and connecting said outer and intermediate shells and forming a circumferentially extending first series of axially extending passages enclosed at their ends by said end heads with alternate partitions engaging the same end head and spaced from the opposite end head to provide a first series of passes adapted to conduct a stream of fluid back and forth substantially the full length of said shells, a pair of spaced radial partitions in the upper part of said heat exchanger and extending the full length of and connecting said outer and intermediate shells and engaging both of said end heads to provide in the upper part of said heat exchanger a chamber therebetween and an entering and a leaving pass in said first series of passes, an inlet through said outer shell communicating with said chamber, an outlet through said outer shell communicating with said leaving pass, a second series of radial partitions extending lengthwise of and connecting said intermediate and inner shells, and forming a second series of axially extending passages enclosed at their ends by said end heads with alternate partitions of said second series engaging the same end head and spaced from the opposite end head to provide a second series of passes adapted to conduct a stream of a second fluid back and forth substantially the full length of intermediate and inner shells, another radial partition in the upper part of the heat exchanger and arranged adjacent said partitions forming said chamber and extending the full length of and connecting said intermediate and inner shells and engaging both of said end heads to provide in the upper part of said heat exchanger an entering pass in register with said chamber and a leaving pass in said second series of passes, said intermediate shell being ported to provide communication between said chamber and said entering pass of said second series of passes and the upper part of said inner shell being ported to provide communication between said leaving pass of said second series of passes and the interior of said inner shell, and another outlet extending through all of said shells and communicating with the upper part of the interior of said inner shell whereby said interior of said inner shell forms a settling chamber.

ROBERT C. STUTZ.

References Cited in the file of this patent

UNITED STATES PATENTS

| Number | Name | Date |
|---|---|---|
| 1,414,751 | Rumery et al. | May 2, 1922 |
| 1,639,051 | Munday | Aug. 16, 1927 |
| 1,854,619 | Mortensen | Apr. 19, 1932 |
| 2,267,819 | Di Pietro | Dec. 30, 1941 |
| 2,356,778 | Morrison | Aug. 29, 1944 |

FOREIGN PATENTS

| Number | Country | Date |
|---|---|---|
| 500,389 | Great Britain | Feb. 8, 1939 |
| 642,878 | Germany | Mar. 4, 1937 |